Dec. 1, 1959 G. N. ROTHSCHILD 2,915,641
ELECTROLUMINESCENT DISPLAY DEVICES
Filed Nov. 1, 1956

INVENTOR
GERTRUDE N. ROTHSCHILD
BY
ATTORNEY

United States Patent Office 2,915,641
Patented Dec. 1, 1959

2,915,641

ELECTROLUMINESCENT DISPLAY DEVICES

Gertrude N. Rothschild, Bayside, N.Y., assignor, by mesne assignments, to Sylvania Electric Products Inc., Wilmington, Del., a corporation of Delaware Application November 1, 1956, Serial No. 619,729

4 Claims. (Cl. 250—213)

My invention is directed toward electroluminescent image display devices.

Certain types of phosphors, when placed in an electric field, will luminesce, the intensity of the emitted light being some function of the strength of this applied field. Consequently, films or layers containing such phosphors can be used to transform electrical energy to light energy. Phosphors of this type are said to be electroluminescent.

An electroluminescent film can be interposed between first and second mutually perpendicular (for example, horizontal and vertical) arrays of parallel, separated electrical conductors to form a crossed-grid structure. In such a structure, the film is divided into small sections or "cells," each of which is situated between one horizontal conductor and one vertical conductor. It is known that applying a suitable electric potential difference between the pair of conductors associated with any given cell will cause that cell to luminesce.

Such applied potentials can be switched or commutated between different pairs of conductors to successively energize each cell in turn, thus producing an effect analogous to scanning in a cathode ray tube. If a signal carrying image information is applied to each energized cell in turn, the combined action of the signal and the scanning effect on the crossed-grid structure will cause the structure to display an image in a manner analogous to a cathode ray tube.

However, in the present state of the art, when the signal carrying image information is an electrical signal, the resultant light output from such cells and crossed-grid structures will be found to be inferior as compared to the light output of a cathode ray tube.

To increase the light output of a cell or crossed-grid structure, it has been proposed to modify the cell or structure in such manner as to render the cell or structure responsive to a signal carrying the image information in the form of a modulated electromagnetic wave as, for example, modulated light. In other words, the cell or structure is modified to act as a light amplifier.

Attempts have been made to construct a light amplifier in the following manner. An electroluminescent layer was applied over one surface of a photoconductive layer. The surfaces of both layers remote from their common interface were each coated with a transparent electrically conductive film. The resulting cell thus contained electroluminescent and photoconductive layers electrically connected together in series.

The electrical characteristics of the photoconductive and electroluminescent layers were chosen so that the dark resistance of the photoconductive layer would be high relative to the resistance of the electroluminescent layer. Therefore, when a voltage was applied across the series combination of the two layers, and the photoconductive layer was not illuminated, the resultant potential drop across the photoconductive element was so large as compared to the drop across the electroluminescent layer that the electroluminescent layer would remain quiescent.

It was believed that when the photoconductive layer was illuminated by a light modulated signal, the resistance of the photoconductive layer would decrease. As the resistance of the photoconductive element decreased, a larger portion of the potential drop across the series combination would appear across the electroluminescent layer and cause it to luminesce. This luminescence would cause additional illumination of the photoconductive layer and further decrease its resistance, thereby accentuating the luminescence of the electroluminescent layer. This electro-optical feedback, it was believed, would cause the light output of the cell to be substantially increased as compared to the light modulated signal.

However, cells of this type have been tested and found to provide insufficient amplification. More particularly, the dark resistance of the photoconductive layer is dependent upon the thickness of this layer; since the dark resistance must be high relative to the resistance of the electroluminescent layer, the photoconductive layer must be relatively thick. However, in this type of cell, most of the light incident upon the surface of the photoconductive layer is absorbed in the surface itself. With the layer thickness required, the percentage change in resistance, resulting from variations in incident light, was insufficient to provide acceptable amplification.

In contradistinction, in my invention a relatively thick photoconductive layer having a relatively high dark resistance is incorporated into an electroluminescent cell in such manner that the entire layer can be excited as efficiently as possible by incident light from the electroluminescent layer and, as a consequence, yields cells and crossed-grid structures which provide significant light amplification.

Accordingly, it is an object of the present invention to increase the light amplification of an electroluminescent cell.

Another object is to increase the light amplification of electroluminescent crossed-grid structures.

Yet another object is to provide a new and improved electroluminescent cell characterized by a light amplification substantially increased over that hitherto obtainable.

Still a further object is to provide a new and improved electroluminescent crossed-grid structure characterized by increased light amplification.

These and other objects of the invention will either be explained or will become apparent hereinafter.

In accordance with the principles of my invention a relatively thick photoconductive layer is applied over one of two opposed surfaces of an electroluminescent layer. The electroluminescent layer has a wavelength dependent light emission characteristic at which the emission attains a maximum value for a given range of wavelengths. The photoconductive layer has a wavelength-dependent photoconductive characteristic at which the photoconductive sensitivity of the layer as a whole attains a maximum value for the same given range of wavelengths.

Each of the surfaces of the two layers remote from the common interface of these layers can be coated with a conductive film, thus forming an electroluminescent cell containing the electroluminescent and photoconductive layers in series connection. In this arrangement, the dark resistance of the photoconductive layer can be made high relative to the resistance of the electroluminescent layer by appropriate adjustment of the thickness of the photoconductive layer. Further, when this relationship of the light emission characteristics of the electroluminescent layer to the photoconductive sensitivity characteristic of the photoconductive layer is established, the photoconductive action is not confined to the surface of the photoconductive layer, but rather extends substantially throughout the entire layer.

Crossed-grid structures incorporating cells of this type can be produced by substituting for one of the conductive films of the cell described above a first array of parallel separated electrically conductive strips or conductors and substituting for the other conductive film a second array of parallel separated electrically conductive strips or conductors.

The first array conductors are positioned at some angle other than 0° with respect to the second array conductors. For purposes of simplicity, this angle is normally chosen to be 90°, and the conductors in one array are positioned horizontally while the conductors in the other array are positioned vertically. Therefore, it is to be understood that when the terms horizontal and vertical are used hereinafter, it is not intended to restrict the structure to mutually perpendicular conductors; obviously other angular orientations can be used.

Illustrative embodiments of my invention will now be described with reference to the accompanying drawings, wherein Fig. 1 is a graph illustrating photoconductive sensitivity and light absorption characteristics of photoconductive layers;

Figure 1:
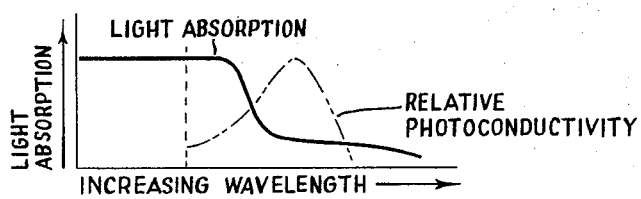

Referring now to Fig. 1, there is shown a graph illustrating the light absorption (per unit thickness) and photoconductive sensitivity characteristics of a photoconductor as a function of the wavelengths of incident light radiation. It will be seen from the solid curve of Fig. 1 that the light absorption is high and constant at short wavelengths; then, as the wavelength increases, the absorption is suddenly and rather sharply reduced at a particular wavelength defined in the art as a fundamental absorption edge; and as the wavelength further increases, the absorption is maintained at a relatively low value.

However, as shown in the dotted curve of Fig. 1, the photoconductive sensitivity, i.e., the percentage change in resistance of the photoconductive layer created by light radiation of a given wavelength and intensity (for a cell of the type shown in Fig. 3), attains a maximum value at wavelengths longer than the wavelength defined by the fundamental absorption edge. Under these conditions, the maximum photoconductive sensitivity region represents a region of relatively low light absorption; the light absorption will not be confined to a thin surface, but rather a portion of the light will penetrate substantially through the entire depth or thickness of the layer.

Figure 2A:
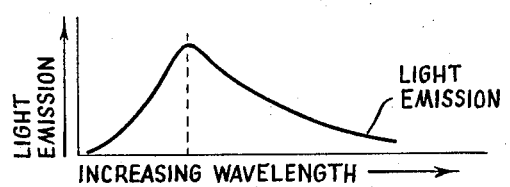
Figs. 2a, 2b, 2c are graphs illustrating certain relationships between the photoconductive sensitivity characteristics of photoconductive layers and the light emission characteristics of electroluminescent layers.

Fig. 2a is a graph of the light emission characteristics of an electroluminescent phosphor as a function of the wavelengths of emitted light. It will be seen that the emission gradually increases to a maximum and then decreases as the wavelength of the emitted light continues to increase.

Figure 2B:
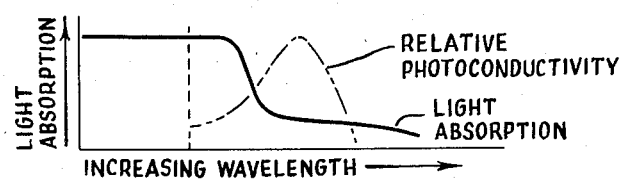

Fig. 2b is a graph of the light absorption and photoconductive sensitivity characteristics of typical photoconductive layers as hitherto employed in conjunction with a phosphor of the type shown in Fig. 2a, Figs. 2a and 2b being drawn to the same scale. It will be seen that the wavelength region for maximum light emission by the electroluminescent phosphor corresponds to a region of high surface absorption and relatively low photoconductivity of the photoconductive layer; this relation explains why the prior art attempts employing cells having layers of this type did not succeed in increasing light amplification to the extent desired.

Figure 2C:
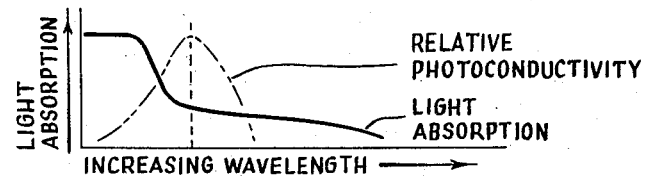

However, by suitably varying the composition of a photoconductive phosphor, the fundamental absorption edge of this phosphor can be shifted in the manner shown in Fig. 2c. Since the photoconductive sensitivity is related to the light absorption, such a change in composition will also shift the region of high photoconductive sensitivity. By an appropriate shift, the region of high sensitivity can be adjusted to correspond to the region of maximum light emission from the electroluminescent layer. This permits the use of a relatively thick photoconductive layer having a relatively high dark resistance relative to the impedance of the electroluminescent layer in the manner taught herein. Alternatively, by suitably varying the composition of an electroluminescent film, its region of maximum light emission can be shifted so as to coincide with or "match" the region of maximum photoconductive sensitivity of the photoconductive layer.

For example, a typical electroluminescent layer formed from zinc sulfide exhibits maximum light emission at a wavelength of about 4500 Angstroms. The wavelength of the fundamental absorption edge of a typical photoconductive layer formed from cadmium sulfide is about 5200 Angstroms; the wavelength defining the maximum photoconductive sensitivity of this layer is about 5300 Angstroms. Hence, when these two layers are employed in an electroluminescent cell or crossed-grid structure as taught by the prior art, the two layers are not "matched" with the resultant adverse results previously described.

However, when the composition of the photoconductive layer is changed as, for example, by using a photoconducting layer composed of cadmium sulfide and zinc sulfide, the molecular weights of both sulfides having a ratio of 1:1, the fundamental absorption edge can be shifted to a wavelength of about 4270 Angstroms. The photoconductive sensitivity of this photoconductive layer will attain a maximum value at about 4500 Angstroms. Hence, when this layer is utilized in conjunction with the typical electroluminescent layer described previously, the two layers are "matched" in the manner taught herein.

Figure 3:
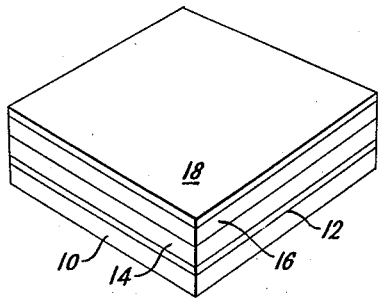
Fig. 3 shows one electroluminescent cell in accordance with my invention.

Fig. 3 illustrates an electroluminescent cell in accordance with the present invention. In Fig. 3, one surface of a glass plate 10 is coated with a transparent first electrically conductive film 12. An electroluminescent phosphor layer 14 is applied over the film 12. A photoconductive layer 16 covers the electroluminescent layer 14. A second electrically conductive film 18 covers the surface of layer 16 remote from the common interface of layers 14 and 16. The light emission characteristic of layer 16 is adjusted relative to the photoconductive sensitivity of layer 14 in the manner shown in Figs. 2a and 2c.

The films and layers are all composed of known materials. For example, the transparent conductive films 12 can be formed of tin oxide. The electroluminescent layer 14 can be composed of zinc sulfide and formed either from a dielectric suspension of electroluminescent phosphors as described, for example, in the copending application, Serial No. 306,909, filed August 28, 1952, by Norman L. Harvey, or can be formed from crystalline films, as described, for example, in U.S. Patent No. 2,685,530. The photoconductive layers 16 can be a mixture of cadmium and zinc sulfides as described above. The conductive film 18 can be formed from the same materials as used for the film 12 or from other various well known materials.

It will be apparent that the dark resistance of the layer 16 can be made high relative to the resistance of layer 14 by suitably adjusting the thickness of layer 16. Further, as described previously, light emitted by layer 14 penetrates into the body of layer 16.

Hence, when a voltage yielded by a battery is applied between films 12 and 18, and film 18 is irradiated with modulated light, this light passes through film 18 and irradiates the photoconductive layer 16, thus reducing the resistance of layer 16. As the resistance decreases, a larger portion of the voltage drop produced across the entire cell appears across the layer 14 and layer 14 begins to luminesce. The light thus produced by layer 14 irradiates layer 16 and further decreases its resistance; as the resistance of layer 16 further decreases, a still larger portion of the voltage drop appears across layer 14; layer 14 becomes more strongly luminescent, thus producing light amplification in the manner previously described.

Figure 4:
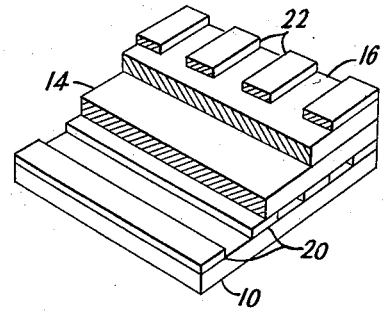
Fig. 4 shows a crossed-grid structure incorporating the cell of Fig. 3.

The cell of Fig. 3 can be incorporated into a crossed-grid structure, as shown in Fig. 4. One surface of a glass plate is coated with a plurality of horizontal, separated, transparent, electrically conductive films or strips 20. A single electroluminescent layer 14 of the same area and shape as plate 1 is applied over the films 2. A single photoconductive layer 16 of the same area and shape as layer 14 is applied over layer 14. A plurality of vertical, parallel, separated electrically conductive films or strips 22, applied over layer 16, complete the structure.

All of the structures of Figs. 3 and 4 can be produced through the use of photo-resist techniques. For example, construction of a crossed-grid structure could begin by applying to the glass surface one of the photosensitive substances conventionally employed in photo-resist practice, optically exposing the surface to a light pattern such as will cause narrow horizontal strips corresponding to the spaces between the desired horizontal conducting strips to be "fixed." The substance can then be removed except in the "fixed" areas. A transparent conducting film can then be applied to the glass. Finally, removal of the "fixed" strips would leave the desired pattern of transparent conductive strips. Subsequent layers in the required geometries can be produced by a repetition of the process.

While I have shown and pointed out my invention as applied above, it will be apparent to those skilled in the art that many modifications can be made within the scope and sphere of my invention as defined in the claims which follow.

What is claimed is:

1. In combination with first and second electrical conductors, a series circuit coupled between said conductors, said circuit including an electroluminescent layer having a predetermined wavelength-dependent light emission characteristic, and a photoconductive layer having a predetermined wavelength-dependent photoconductive sensitivity characteristic, said layers being arranged one above the other and having a common interface, the light emission characteristic of said first layer being matched with the photoconductive sensitivity characteristic of said second layer to establish a common range of wavelengths over which both emission and absorption attain maximum values.

2. An electroluminescent cell comprising an electroluminescent layer having a predetermined wavelength-dependent light emission characteristic; a photoconductive layer having a predetermined wavelength-dependent photoconductive sensitivity characteristic; said layer being arranged one above the other and having a common interface; an electrically conductive first film coupled to a surface of said electroluminescent layer remote from said interface; and an electrically conductive second film coupled to a surface of said photoconductive layer remote from said interface, the light emission characteristic of said electroluminescent layer being matched with the photoconductive sensitivity characteristic of said photoconductive layer to establish a common range of wavelengths over which both emission and sensitivity attain maximum values.

3. An electroluminescent cell comprising a pair of separated electrically conductive electrodes, and a series circuit coupled between said electrodes and including in the order named an electroluminescent first element and a photoconductive second element, said first element having a wavelength-dependent light emission characteristic at which the emission attains a maximum value for a given range of wavelengths, said second element having a wavelength-dependent photoconductive sensitivity characteristic at which the sensitivity attains a maximum value over substantially the same said range and further having a fundamental absorption edge defined by a wavelength smaller than any wavelength in said range.

4. In combination, a first array of parallel, separated electrical conductors extending along a first direction; a second array of parallel, separated electrical conductors extending along a second and different direction; and a structure interposed between and in electrical contact with said first and second arrays, said structure including in series connection a first electroluminescent element and a second photoconductive element, said first element having a wavelength-dependent light emission characteristic at which the emission attains a maximum value for a given range of wavelengths, said second element having a wavelength-dependent photoconductive sensitivity characteristic at which the sensitivity attains a maximum value over substantially the same said range and further having a fundamental absorption edge defined by a wavelength smaller than any wavelength in said range.

References Cited in the file of this patent

UNITED STATES PATENTS

| 2,698,915 | Piper | Jan. 4, 1955 |
| 2,773,992 | Ullery | Dec. 11, 1956 |
| 2,818,531 | Peek | Dec. 31, 1957 |

FOREIGN PATENTS

| 157,101 | Australia | June 16, 1954 |

OTHER REFERENCES

Kazan and Nicoll: "An Electroluminescent Light-Amplifying Picture Panel," Proceedings of the I.R.E., December 1955, pages 1888 to 1897.

UNITED STATES PATENT OFFICE
CERTIFICATE OF CORRECTION

Patent No. 2,915,641                  December 1, 1959

Gertrude N. Rothschild

It is hereby certified that error appears in the above numbered patent requiring correction and that the said Letters Patent should read as corrected below.

Column 5, line 53, for "absorption" read -- sensitivity --; column 6, line 2, for "layer" read -- layers --.

Signed and sealed this 3rd day of October 1961.

(SEAL)
Attest:

ERNEST W. SWIDER
Attesting Officer

DAVID L. LADD
Commissioner of Patents

USCOMM-DC